Dec. 1, 1925.
C. E. BARNHILL
1,563,953
METHOD OF DESICCATING EGGS
Filed April 20, 1925
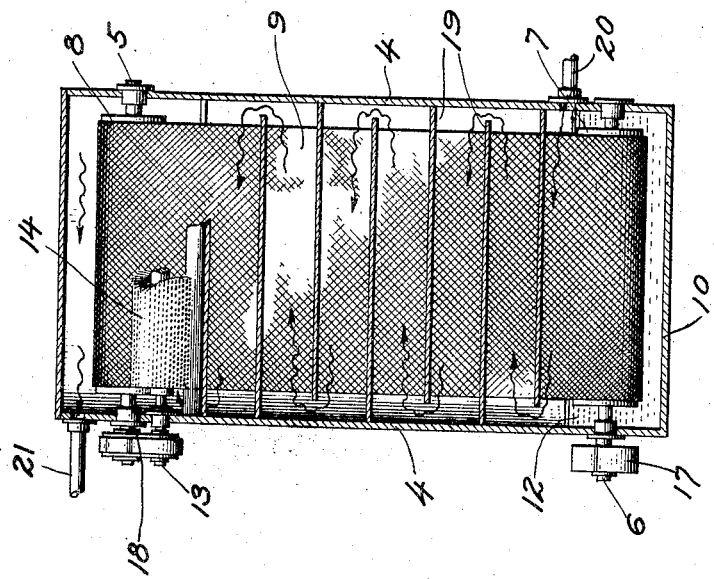
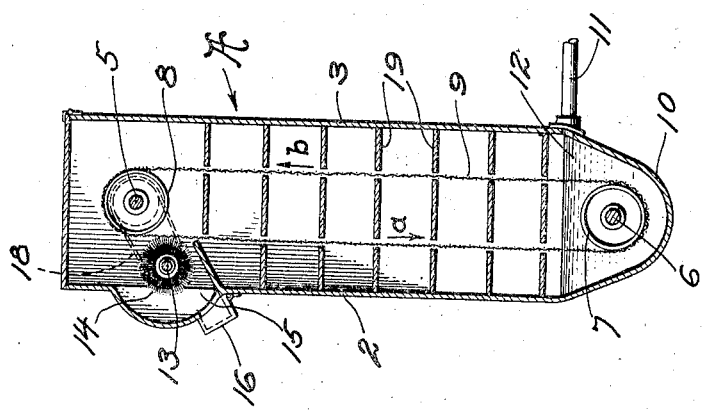
INVENTOR.
Cleo E. Barnhill
BY
ATTORNEYS.

Patented Dec. 1, 1925.

1,563,953

UNITED STATES PATENT OFFICE.

CLEO E. BARNHILL, OF SAN FRANCISCO, CALIFORNIA.

METHOD OF DESICCATING EGGS.

Application filed April 20, 1925. Serial No. 24,384.

*To all whom it may concern:*

Be it known that I, CLEO E. BARNHILL, a citizen of the United States, residing in the city and county of San Francisco and State of California, have invented new and useful Improvements in Methods of Desiccating Eggs, of which the following is a specification.

This invention relates to a method of desiccating eggs.

At the present time it is safe to say that 95% of all dried egg albumen is produced in China under the old pan method of drying. This method is in most instances very inefficient and unsanitary, and yet it is the only commercially known method that will produce a dried albumen preserving the original life or beating strength of the product.

The method consists first of a ripening process of the albumen liquid. The liquid is placed in large oak barrels in a warm room and allowed to stand several days or until fermentation has taken place to the extent that a heavy foam or froth forms on the top of the liquid. This froth is skimmed off and thrown away and the liquid remaining is treated with ammonia and placed in trays or pans about the size of large pie pans. These pans are placed on shelves in drying rooms which are pre-heated by a furnace, although some foreign firms use steam heat and more sanitary methods. The liquid in the pans is allow to slowly evaporate and it takes about forty-eight (48) hours and sometimes longer. This dry albumen assumes a crystal-like form and is scraped or otherwise removed, after which it is pulverized or granulated and packed for the market.

Other methods and equipment are employed which will desiccate the whole egg, the albumen, or the egg yolk. Among these may be mentioned vacuum dryers, spray dryers, drum dryers, etc., but none of them will produce dried egg albumen without destroying to a great extent the beating quality or best life of the albumen.

The object of the present invention is to provide a method whereby albumen may be dried quickly, efficiently, and in a sanitary manner while preserving the full beating strength of the albumen; to provide a method whereby the albumen is obtained in granular or powdered form, and further to provide a method whereby the albumen obtained will be readily soluble in water so that it may be quickly beaten up after water has been applied.

The method preferably described consists in sparating the yolks of the eggs from the albumen, applying the albumen in a thin film on an open mesh wire screen surface so that the albumen will coat the wire and form a film over the interstices, subjecting the film to the action of a current of warm dry air, and removing the film when dry by brushes or other suitable means.

For the purpose of clearly describing the method in detail reference will be made to the accompanying drawings which are diagrammatic views of one form of apparatus suitable for the carrying out of the present method.

Fig. 1 is a side elevation in section showing the drying apparatus.

Fig. 2 is a front view partially in section.

Referring to the drawings in detail and particularly to Fig. 1, A indicates in general a casing consisting of front and rear walls, such as indicated at 2 and 3, and end walls 4. Extending through the end walls and journalled therein adjacent to the upper end of the casing is a shaft 5. Similarly extending through the lower part of the casing and journalled in the end walls is a shaft 6. Secured on the shafts within the casing are elongated pulleys or rollers 7 and 8, and carried by said rollers is an endless belt 9 which is constructed of an open mesh fabric such as a wire screen or the like. Formed in the lower portion of the casing is a hopper shaped bottom 10. Adapted to be delivered to the hopper in any suitable manner, as for instance through pipe 11, is a liquid material such as albumen or the like as indicated at 12. Disposed adjacent the upper shaft 5 is a shaft 13, and secured thereon is a revolving brush 14. Formed below the brush is a hopper 15, and a discharge spout 16. The rollers 7 and 8 may be driven by a pulley such as shown at 17 and the shaft 13 may be driven from the upper shaft 5 through means of a belt and pulleys as indicated by dotted lines at 18. Disposed within the casing between the end walls are a plurality of horizontally disposed baffle plates 19. These baffle plates are substantially equally spaced and super-posed as shown and they serve the function of causing a current of drying air to follow a zigzag path while passing through the casing. The drying air is delivered to the lower part of the casing through a pipe 20 which may be connected with a heater and a blower not here shown and the air escapes from the upper part of the casing through a pipe 21. The operation will be as follows: The albumen or other egg material to be dried is delivered to the lower hopper portion 12 of the casing through the pipe 11. The continuous or endless belt 9 is set in motion by applying power to the pulley 17 and one side of the belt will thus travel continuously in a downward direction as indicated by arrow $a$. It will thus pass under the albumen contained within the hopper shaped bottom and as such will become covered with the liquid. The other side of the belt travels in an upward direction as indicated by arrow $b$ and as it travels fairly slow and is continuously subjected to warm dry air which is passing through the casing and between the baffle plates 19 the albumen will become dry and when the belt passes over the upper pulley 9 it is finally engaged by a continuously rotating brush 14 and the dried albumen is thus removed in a granular or powdered form and is collected in the hopper 15 from where it may be removed from time to time through the spout 16. Any suitable drying temperature may be maintained within the casing, but is should be obvious that the temperature must be below the coagulating point of the albumen or egg material. A temperature of approximately 130° F. has been found both efficient and desirable. The drying action is rapid due to the fact that the liquid or egg material is maintained in an exceedingly thin film form while on the belt. Actual practice shows that it seldom requires more than ten minutes to complete the drying operation. The rapidity of the drying is also materially increased due to the fact that the egg material is maintained in a film-like condition and both sides of the film is exposed to the drying air current passing through the casing. In other words, the film is dried from opposite sides at the same time and this obviously materially decreases the drying period required. A wire mesh fabric has been found desirable as it will withstand the continuous wear of the revolving brush 14. Other material may, of course, be employed, but a wire fabric is preferable. The interstices or openings formed in the screen may be as large or small as desired. Meshes or openings approximately ⅛ of an inch have been found practical as it permits the egg material to cover the same in a film form. If the openings or interstices are made too large the film has a tendency to break and the advantage of drying the egg material in a film form is thus lost.

The method of drying here described has many advantages. First of all, it permits rapid drying of the egg material whether albumen, egg yolks, or the whole egg. It permits the sanitary handling of the material. It produces a granular or powdered material due to the abrasive action of the rotating brush, thus eliminating the necessity of grinding the albumen crystals when dry. It produces a dried albumen or egg material which is readily soluble in water, and, above all, it produces a dried albumen in which the full beating strength is completely preserved. The moisture content seldom exceeds 8% when the drying operation is completed and this is also of importance as it is practically impossible to produce dried albumen by the Chinese method which contains less than 15% to 18%. The keeping qualities are increased due to the lower moisture content and a sweet, dry product is finally obtained which is free from the objectionable odors that are so common with similar products obtained by the Chinese method and other methods now in use. The process is applicable to the drying of albumen alone, to the drying of the egg yolks alone, or to the drying of the whole egg; to-wit, a mixture of yolk and albumen.

Having thus described my invention, what I claim and desire to secure by Letters Patent is—

1. A method of desiccating egg albumen which consists in separating the egg yolks and albumen and exposing the albumen in the form of a thin suspended film so that both sides of the film are exposed to the drying action of a warm current of dry air to dry the albumen.

2. A method of desiccating albumen which consists in separating the egg yolks and albumen, applying the albumen in the form of a thin film to an open mesh fabric, in which the openings between the meshes are of a size to permit the albumen to form a film over the openings, drying said film, and removing the film when dry by a brushing action.

3. A method of desiccating eggs which consists in separating the liquid content from the shells, applying the liquid in the form of a thin film to an open mesh fabric in which the openings between the meshes are of a size to permit the albumen to form a film over the openings, drying the film, and then removing the dry film.

CLEO E. BARNHILL.